United States Patent

[11] 3,550,558

| [72] | Inventor | Sidney Sachs |
| | | 540 Hobart Road, Paramus, N.J. 07652 |
| [21] | Appl. No. | 751,773 |
| [22] | Filed | Aug. 12, 1968 |
| [45] | Patented | Dec. 29, 1970 |

[54] ANIMAL CAGES
11 Claims, 21 Drawing Figs.

[52] U.S. Cl. .................................................. 119/15,
119/22, 119/28
[51] Int. Cl. .................................................... A01k 01/02,
A01k 31/04
[50] Field of Search ......................................... 119/17, 18,
19, 22, 15, 28; 43/131

[56] References Cited
UNITED STATES PATENTS

| 2,388,157 | 10/1945 | Kerr | 119/17X |
| 2,701,547 | 2/1955 | Shaw | 119/22 |
| 3,087,458 | 4/1963 | Bennett, Jr. | 119/19X |
| 3,087,459 | 4/1963 | Dirch | 119/17 |
| 3,292,582 | 12/1966 | Rubricius | 119/17 |
| 3,294,065 | 12/1966 | Myers et al. | 119/25 |
| 3,295,246 | 1/1967 | Landsman et al. | 43/131 |

*Primary Examiner*—Aldrich F. Medbery
*Attorney*—Charles E. Temko

ABSTRACT: A no-space-loss multicage construction in which the cages are adjustable in height and variable in length. All cage doors are adjustable with respect to their hinges which are adjustable in height. Each vertical stack of cages, in addition to being adjustable so as to provide different sized cages, also has a completely adjustable drainage system, separated at each level and enclosed so that animal contact therewith is eliminated. Cages in any vertical stack can be changed without affecting cages in any adjoining stack. Base trays have individual hygienic integral food and water receptacles and independent full gravity drainage with a main horizontal pressurized waste removal drain. Vertical posts have detachably secured thereto an anti-insect material carrier. Doors are interchangeable from outer to inner intermediate position.

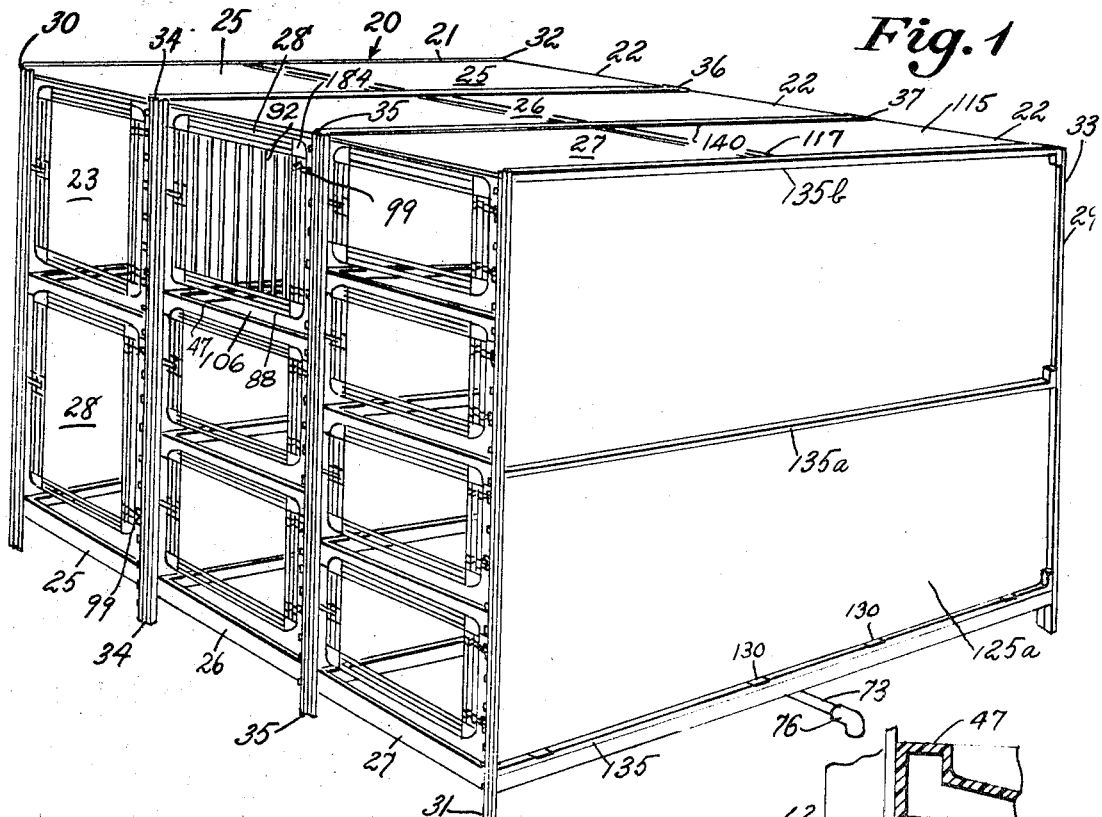
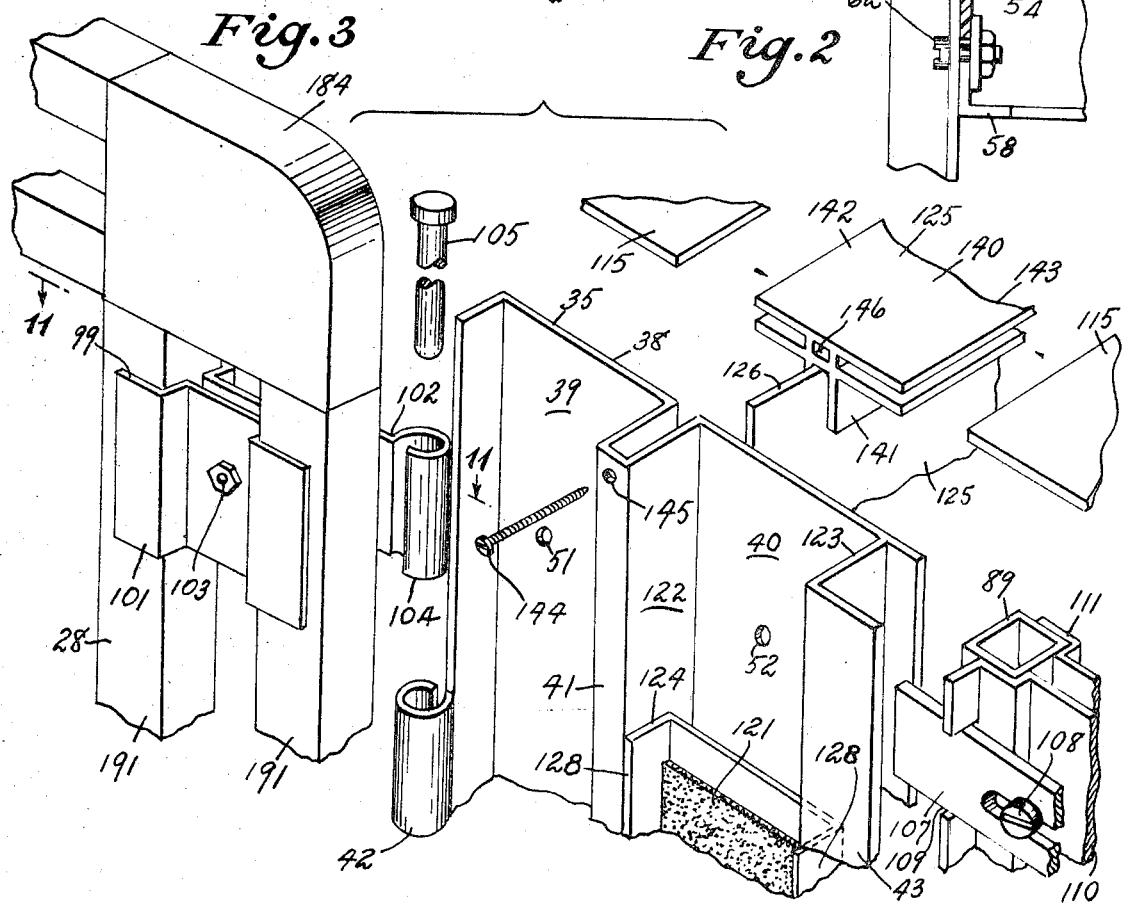

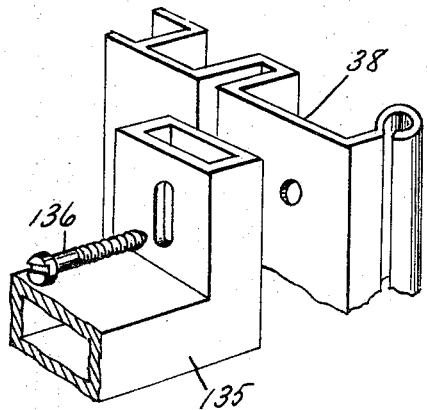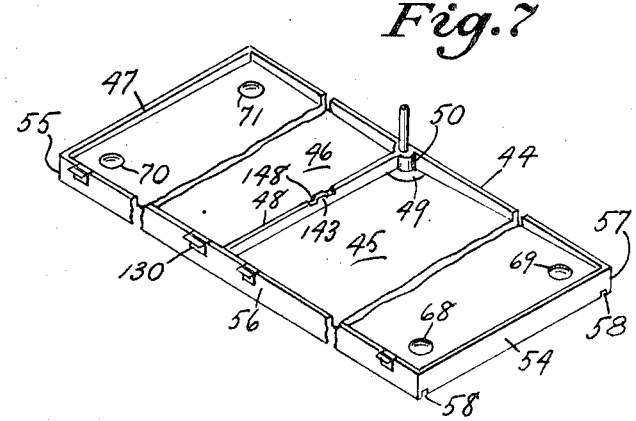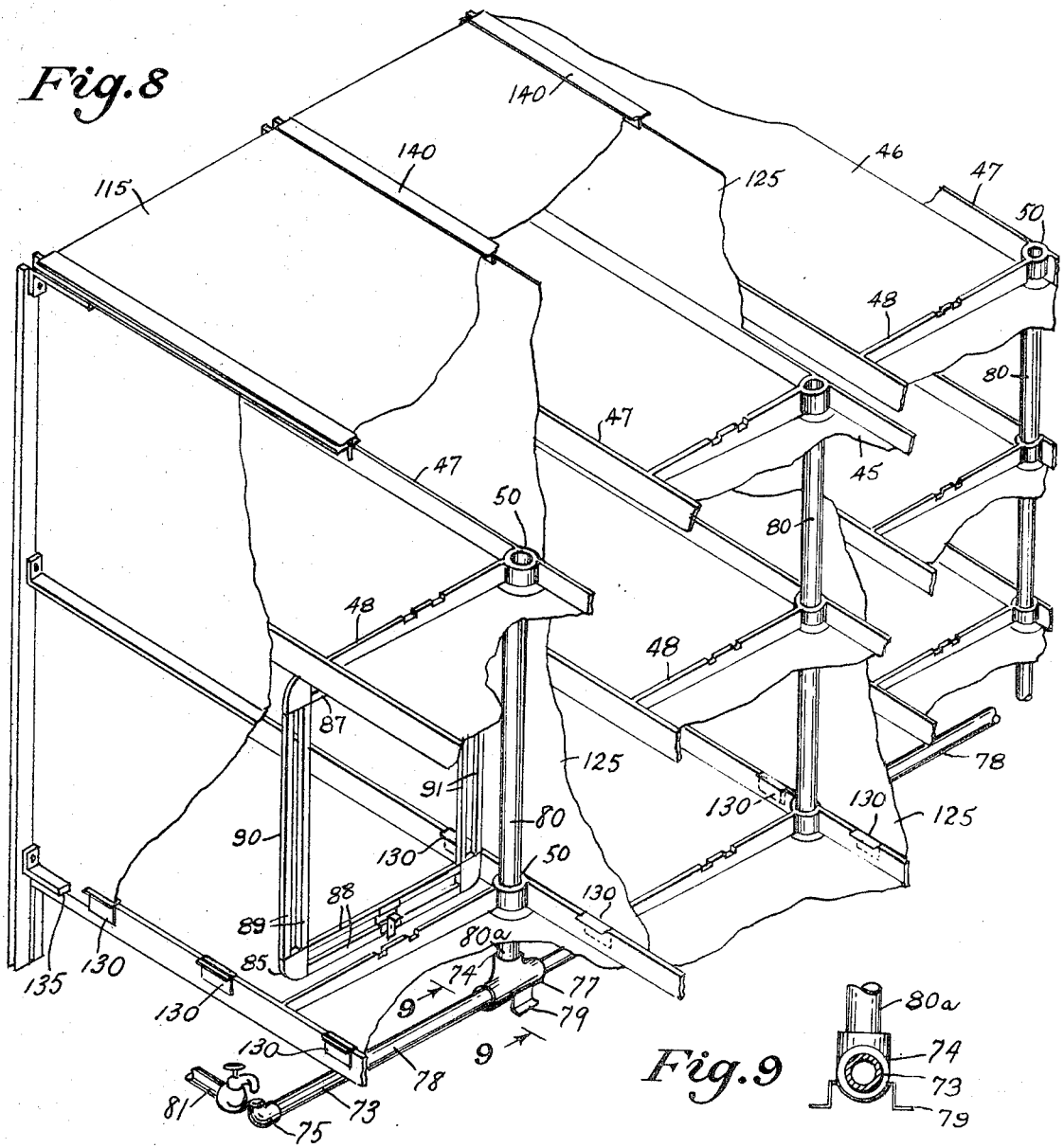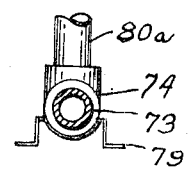

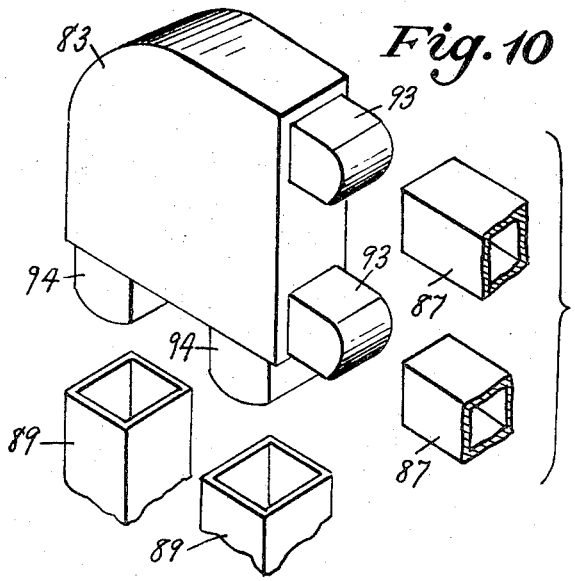
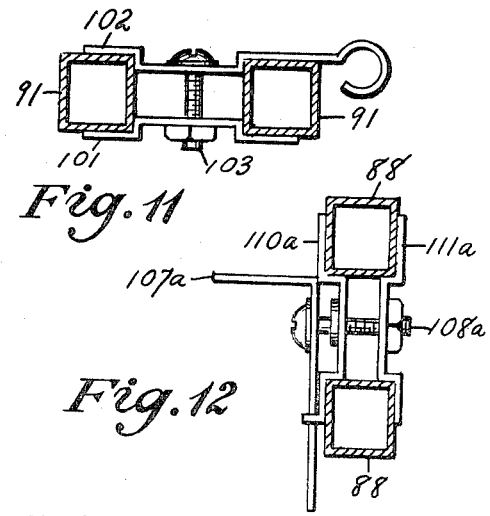
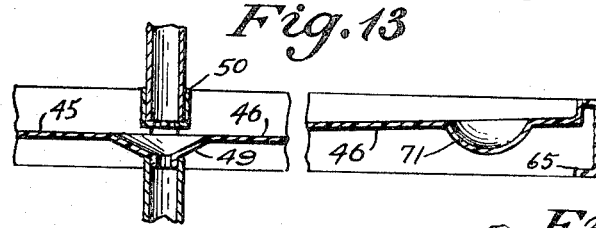
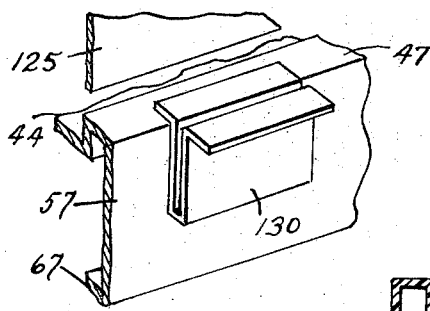
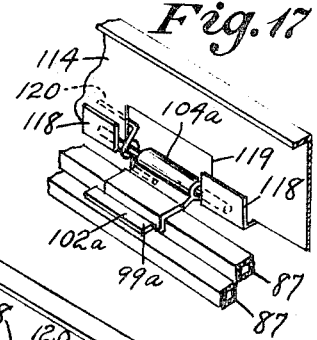
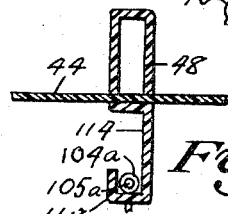
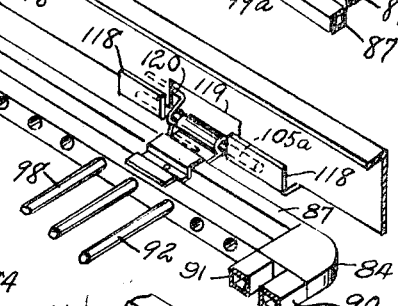
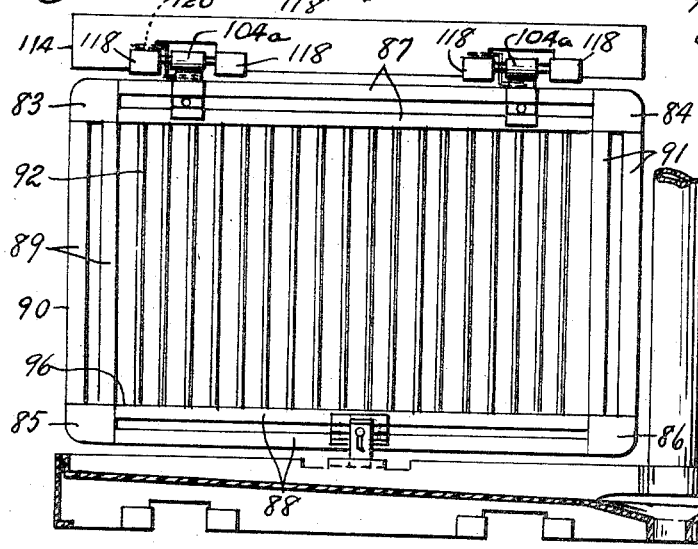
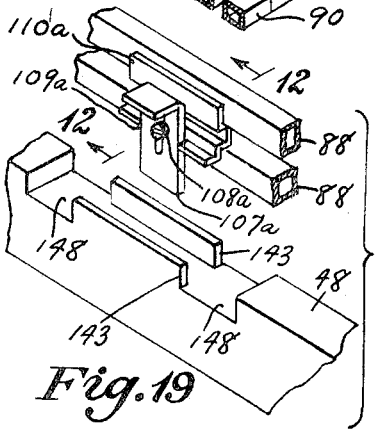

ANIMAL CAGES

This invention relates generally to animal cages and more particularly to multicage construction.

It is among the principal objects of this invention to provide structure of the class described which is especially suited to the labor saving housing and healthy maintenance of pets such as dogs, cats and the like and laboratory animals.

Another object herein lies in the provision of structure of the class described which has a plurality of base trays, which are composed of impervious material with integral food and water receptacles, and regardless of position are directly connected to an individual gravity drain, so as to prevent the animal from exposure to soil from an adjacent animal, and which base trays are vertically shiftable so as to accommodate variously sized animals in the same cage stack, with the doors also vertically adjustable in position, and changeable to accommodate different vertical sizes of cages.

Another object of the present invention lies in the provision of vertical posts which are adapted to hold insect control material.

A feature of the invention lies in the fact that although the cage structure is compact, the animals are isolated from each other, and they are given ample ventilation.

A still further object herein is the provision of interchangeable intermediate doors which are readily pivoted to provide different cage areas and to aid in cleaning the cages.

Another object of the present construction is to provide for a completely enclosed main horizontal drain with pressure flush thereof.

These objects and other incidental ends and advantages will more fully appear in the progress of this disclosure and be pointed out in the appended claims.

In the drawings in which similar reference characters designate corresponding parts throughout the several views:

FIG. 1 is a perspective view of an embodiment of the invention, with many of the bars 92 omitted.

FIG. 2 is an enlarged fragmentary sectional view as seen from the plane 2-2 on FIG. 4.

FIG. 3 is a fragmentary exploded view in perspective.

FIG. 6 is an enlarged fragmentary perspective view showing the connection of a strut to a vertical post.

FIG. 7 is a reduced fragmentary perspective view of a base tray.

FIG. 8 is a fragmentary perspective view as seen from the upper left front of FIG. 1.

FIG. 9 is an enlarged fragmentary sectional view of FIG. 8 as seen from the plane 9-9 on FIG. 8.

FIG. 10 is an enlarged fragmentary exploded view in perspective, of the upper left-hand corner of the intermediate door shown in FIG. 18.

FIG. 11 is an enlarged fragmentary horizontal sectional view as seen from the plane 11-11 on FIG. 3.

FIG. 12 is an enlarged fragmentary sectional view as seen from the plane 12-12 on FIG. 19.

FIG. 13 is an enlarged fragmentary detail sectional view as seen from the plane 13-13 on FIG. 4.

FIG. 14 is an enlarged fragmentary exploded view of the rim of a base tray and associated parts, showing a portion of a divider and a T-bracket therefore.

FIG. 15 is an enlarged fragmentary sectional view as seen from the plane 15-15 on FIG. 4.

FIG. 16 is an enlarged fragmentary perspective view of an upper portion of an intermediate door in elevated position, with associated structure.

FIG. 17 is a fragmentary detailed perspective view of a corresponding portion of FIG. 16.

FIG. 18 is a fragmentary elevational view of an intermediate door in lowered position and associated parts.

FIG. 19 is an enlarged fragmentary perspective view showing the intermediate door bolt and latch structure.

Figure 4:
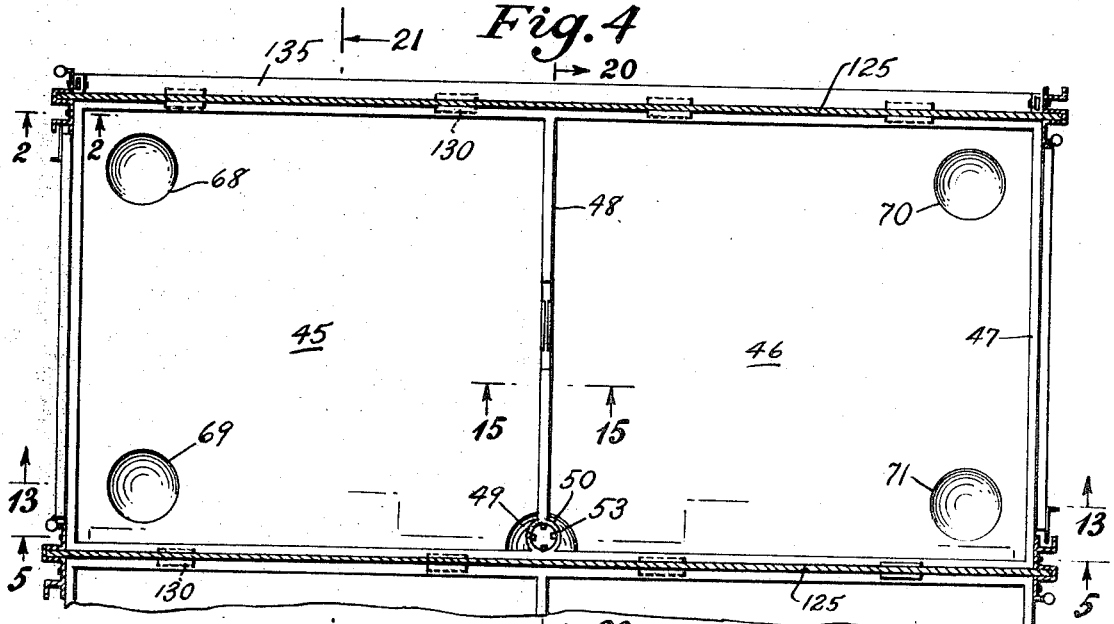
FIG. 4 is a fragmentary horizontal sectional view as seen from the plane 4-4 on FIG. 5.

In accordance with the invention, the construction generally indicated by reference character 20 comprises broadly a bank 21, including a plurality of cage units 22, each having a vertical stack of individual cages 23. As will be apparent there may be any desired number of banks, cage units, and individual cages, and for purposes of clarity I will now describe a group as shown in FIG. 1 which has three units, a left unit 25, a middle unit 26 and a right unit 27. I have found it to be desirable to have the front doors 28 and the rear doors 29 to be hinged along their right edges, but obviously this may be reversed.

Each cage unit 22 is supported by four vertical posts, and when there is a group, on the ends there will be end posts 30, 31, 32 and 33 and intermediate posts 34, 35, 36, 37. The posts are all generally identical being preferably fabricated by cutting from a long extrusion 38 (FIG. 3). For example, the post 35 formed by extrusion 38 has first and second planar portions 39 and 40, a channel portion 41, a stationary hinge portion 42 and a continuous latch portion 43. Portions 39 and 40 each have a series of spaced holes 51 and 52, arranged at predetermined intervals to accommodate to the modular arrangement of the cages.

The base trays 44 are preferably fabricated by casting, in a single piece, fiberglass-reinforced polyester resin, and since they are all substantially identical a detailed description of one will suffice for all. As best seen in FIG. 7, tray 44 includes a front pan 45, a rear pan 46, a peripheral rim 47, and an intermediate rim 48, which at the right thereof overlies a drain bowl 49, and widens to form a socket 50. The socket 50 has a plurality of inwardly directed projections 53 (FIG. 4) which engage and support the lower end of the vertical drainpipe section 80 immediately thereabove (FIG. 5) but do not extend inwardly more than the wall thickness of said pipe section so as not to interfere with the free flow of waste therethrough. The pans 45 and 46 are pitched toward the drain bowl 49 and since there are no open troughs, each pan empties into the drain without going over into the other pan.

The peripheral rim 47 extends downwardly into a continuous front skirt 54, rear skirt 55, left side skirt 56, and right side skirt 57, said skirts having inwardly extending lips 64, 65, 66 (FIG. 5) and 67 (FIG. 14). The front and rear skirts have downward opening notches 58, extending into said lips, in which are disposed bolts and nuts 62 by which the base tray is detachably secured to its posts.

The tray 44 has a plurality of integral depressions 68, 69, 70 and 71 which serve as food and water dishes. The edges of said depressions as well as other edges are rounded so that food or other debris are not caught thereat and the pans and dishes of the base trays may be easily maintained in a clean and sanitary condition.

The main horizontal drain 73 under each bank of units has a plurality of inlets 74, a flushing inlet 75 and an outlet 76. The inlets 74 are provided by upward opening T-unions 77 which are in leak proof connection with the pipes 78, and carried by cradle supports 79, the upward openings in the T-unions being in line with the vertical pipe members 80, in turn positioned by the sockets 50 and drain bowls 49. The outlet 76 is connected to the sewerage system (not shown). The flushing inlet 75 is provided with any suitable source 81 of water under pressure, and dependent upon the local sanitary code, may be indirectly or directly connected with backflow prevention.

The doors 28 and 29 as well as the doors 90 are of substantially identical construction so that a detailed description of one will suffice for all. A door 90 (FIG. 18) is composed of four identical corner members 83, 84, 85, and 86; upper and lower horizontal members 87 and 88; left end vertical members 89; right end vertical members 91, and inner members 92. As best seen in FIG. 10 a corner member 83 is provided with lateral tenons 93 and vertical tenons 94 these are sized to have a force fit with respect to the members 87 and 89 which are of correlated tubular cross section. The opposed lower wall 95 and upper wall 96 are provided with deep pockets 97 within which are securely retained the ends 98 of the inner members 92. Since the width of the base trays 44 and consequently the interpost spacing are standardized for a given installation of a cage unit 22, it will be seen that doors of varying heights may be readily assembled by merely changing the member 89, 91, and 92. Furthermore when a larger animal is involved fewer members 92 may be used.

Hinge connections are of two arrangements, for swinging about a vertical or horizontal axis. The former is exemplified by the hinged connection of a door 28 to a post (FIG. 3).

A hinge 99 includes a front plate 101 and a rear plate 102 each having a central depression, with a bolt and nut 103 holding them clamped on members 191 near corner 184. Plate 102 extends laterally to form an integral knuckle 104. Knuckle 104 is aligned with stationary hinge portion 42 and hinge pin 105 is dropped down to pivotally interconnect the two. Since there are a plurality of portions 42 spaced along the post 38, the doors can be placed at different positions to accommodate to various selected cage heights and to the door position with respect to a given cage so that a space 106 between the numbers 88 and the upper edge of rim 47 may be provided for supplying food and water to the depressed dishes 68 and 69 and for cage flushing by use of a hose with rotating brush (not shown). When a door 28 is swung closed about a hinge 99, it may be kept closed, regardless of adjusted vertical position, by the sliding bolt 107 (FIG. 3) which goes behind continuous latch portion 43, which is mounted on a screw 108, and within a notch 109 in plate 110. Screw 108 has a fixed collar which clamps plates 110 and 111 upon members 89. Compare FIG. 12.

For the intermediate door 90 swinging about a horizontal axis, structure the same as that described above is utilized. This is seen in FIGS. 16, 17, and 18 where corresponding parts are given the same reference characters with the suffix a. The support 114 for an intermediate door 90 is inverted L in cross section and is secured to the middle of the base tray 44 thereabove in a suitable manner as by cementing (FIG. 15), and the topmost support 114, since there is no base tray thereabove is secured to the roof plate 115 (FIG. 5) with a bolts 116 and a reinforcing strip 117. The lower edge of support 114 has integral hooks 118, bordering cutouts 119, which hooks hold pins 105a. Coil springs 120 wind about pins 105a and the ends thereof, engaging support 114 and door 90, urge said door up to an out of the way horizontal position when the bolt 107a is retracted upward. The bolt 107a (FIGS. 12 and 19) is identical with the bolt 107 and other corresponding parts are given similar reference characters with the suffix a. The sliding bolt 107a coacts with the latch portions 143 which are located in a depression 148 in the intermediate rim 48.

Assembly and installation is a quick and convenient operation, and one manner of so doing is here described. First the pipe parts 78 of modular lengths are connected to the T-unions 77 on supports 79 and connected to inlet 75 and outlet 76. The lowermost vertical pipe members 80a are seated in the appropriate T-unions 77. Next the bottommost base trays 44 are connected to the posts and this holds other posts upright, with the drain bowls 49 seated in the upper end of pipe members 80a. Now the height of the lowest cages is decided upon and enough sections of modular vertical pipe members 80b are rested one above the other so that the lower ends are seated in the socket 50 and the upper open ends of the pipe members are positioned at a level to receive the drain bowl funnel portion, of the next higher base trays 44, whereupon the skirts 54 and 55 are fastened to the uprights by bolts through holes 51 and 52.

This process is repeated until the uppermost base tray 44 is in place. Now a plurality of open T-brackets 130 are pushed down between the side by side skirts of the bottom row of base trays. At the outermost skirts, the T-brackets 130 are held by the struts 135 which extend between the front and rear posts and are secured thereto by bolts 136. Next the dividers 125, which form the vertical walls between the cage stacks or cage units 22, are slid vertically downward between the juxtaposed channel portions 41 and between the skirts of the base trays disposed above the lowermost base tray in each stack, to seat in the T-brackets 130. Next the divider cap 140 is set down upon the upper edge 126 of the divider 125, with said edge 126 entering the lower channel 141. Roof plates 115 are placed between opposed channels 142 and 143 on the divider cap 125 and screws 144 are passed through holes 145 to threadedly engage the bore 146. Outward flexing of the end panels 125a is controlled by the middle struts 135a and the top struts 135b (FIG. 1).

The use and positioning of the doors 28 and 29 is very flexible. Not only may the doors be raised or lowered by removing pins 105 and shifting parts 104 to other hinge portions 42, but smaller vertical adjustments are obtained by loosening the bolts and nuts 103 so that plates 101 and 102 may be shifted along the vertical members 191 and retightened.

Upon release of a sliding bolt 107a, a door 90 will swing up by spring action to an out of the way horizontal position to provide a single cage of double length for a larger animal or to provide a greater runway. By lowering the door 90 and securing it in vertical position, an animal may be confined on pan 45 or pan 46 while the other pan is thoroughly cleaned. Even with the door 90 lowered to a closed position, cross ventilation is maintained, and two smaller separate cages are provided.

Positioned between opposed surfaces 122 and 123 of the posts (see post 35 in FIG. 3) are elongated carriers 124 upon which is disposed anti-insect material 121 which, being in proximity to each of the cages, is adapted to control insects therein. The carrier is preferably provided with resilient flanges 128 which detachably frictionally engage said surfaces 122 and 123.

Figure 5:
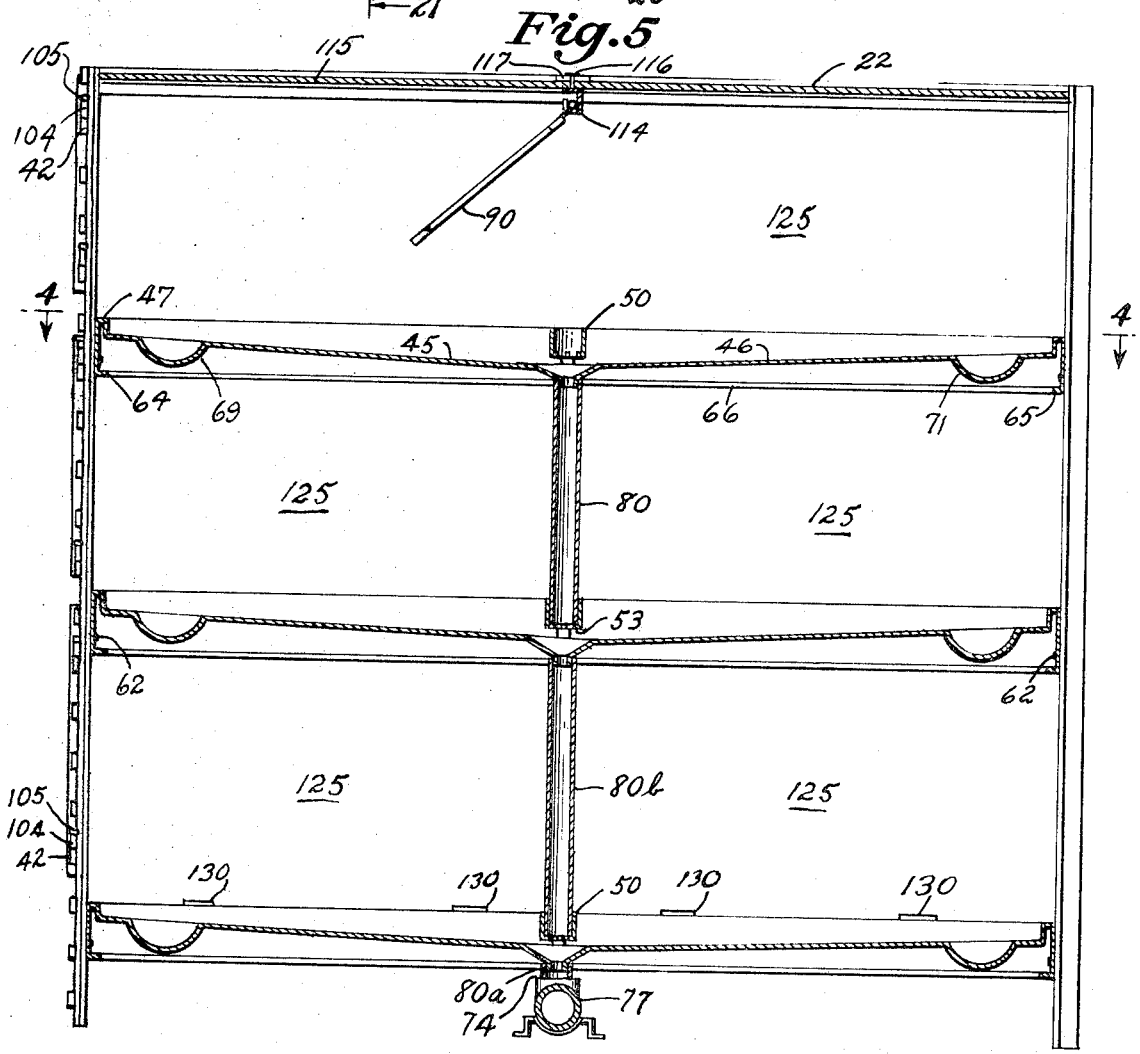
FIG. 5 is a vertical sectional view as seen from the plane 5-5 on FIG. 4.
Figure 20:
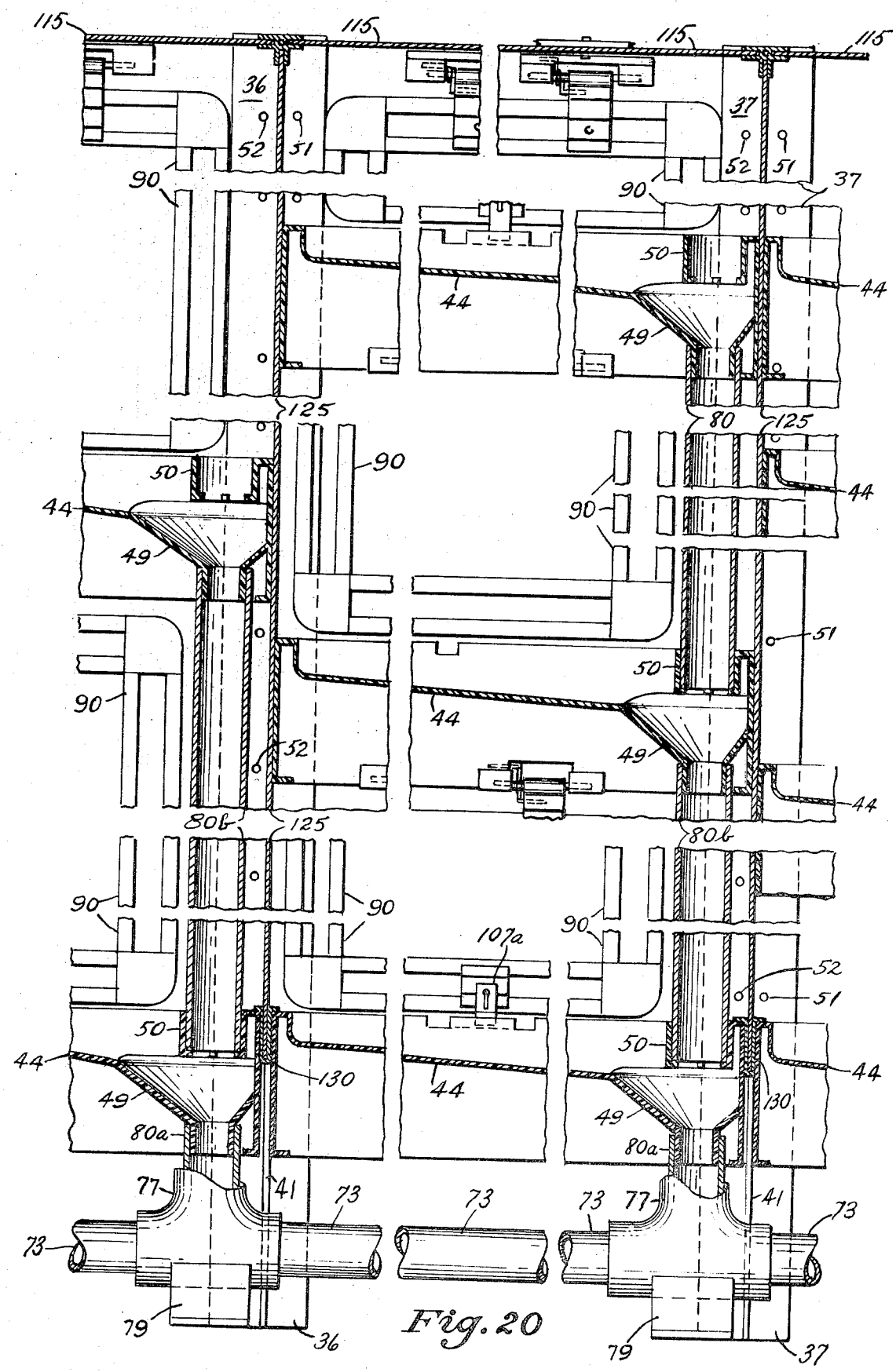
FIG. 20 is an enlarged fragmentary sectional view, somewhat schematic, as seen from the plane 20-20 on FIG. 4.
Figure 21:
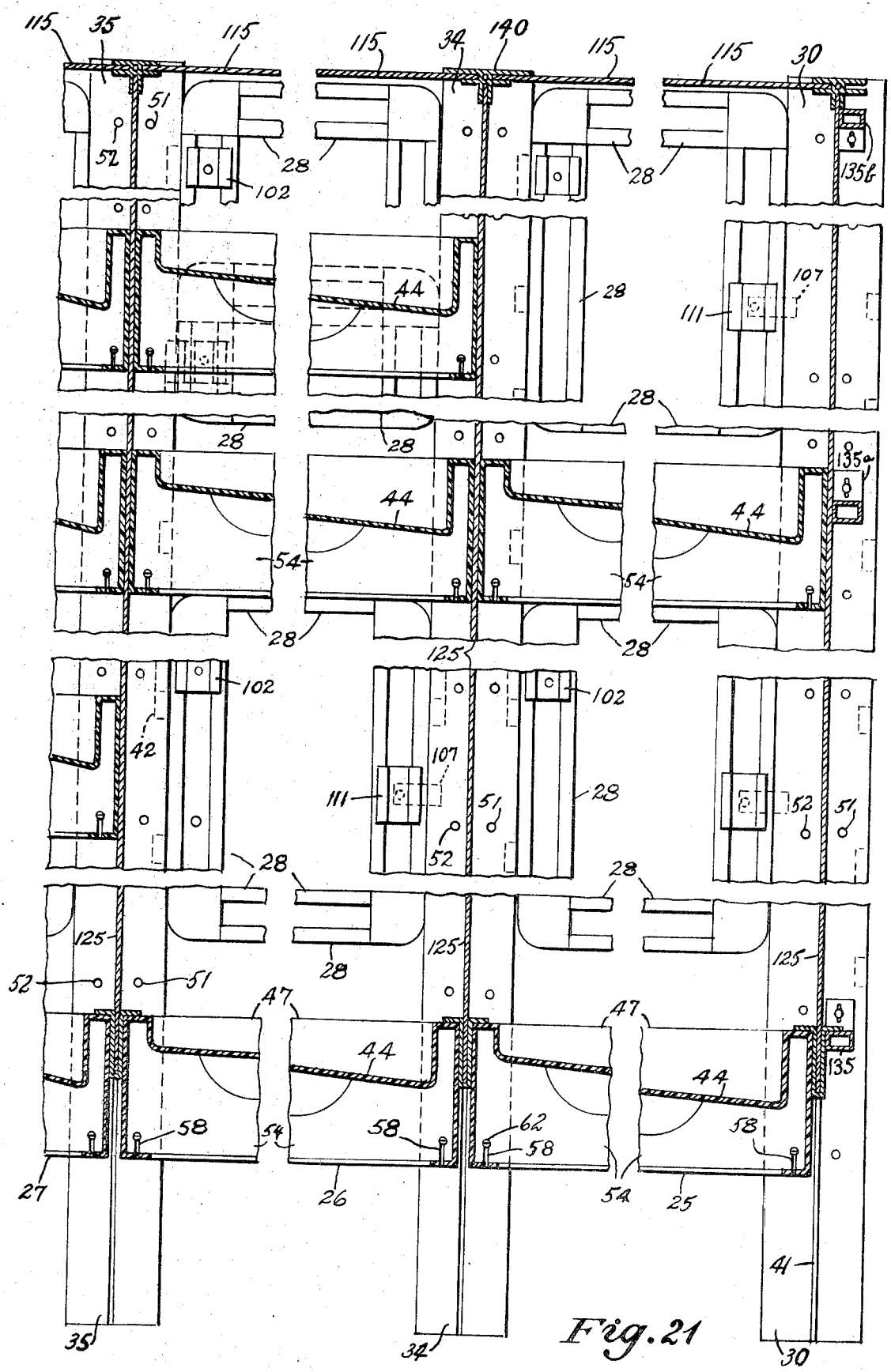
FIG. 21 is an enlarged fragmentary sectional view, somewhat schematic, as seen from the plane 21-21 on FIG. 4.

Turning to FIGS. 20 and 5, it will be seen that the pipe elements 80 form a continuous leakproof conduit from each drain bowl 49 to the next lower drain bowl 49, and thence to the main horizontal drain 73. Because the pipe elements 80 are precut to modular lengths correlated to the vertical spacing of the holes 51 and 52, a proper fit is assured regardless of the selected position for each base tray 44.

I wish it to be understood that I do not desire to be limited to the exact details of construction shown and described for obvious modification will occur to a person skilled in the art to which the present invention relates.

I claim:

1. Animal cage construction comprising: a plurality of upright posts; a plurality of shaped base trays connected to said posts in vertically stacked arrangement; said trays each having an inclined floor and a plurality of walls surrounding said floor forming a peripheral rim, certain of said walls forming means for interconnecting with said posts; said floor having a low point forming a drain bowl having an opening; a vertically arranged socket supported on said peripheral rim of said base tray, and having a lower end space from and overlying said drain bowl opening and constituting an unobstructed tray excrement removal and drain means; a main drain; means interconnecting said main drain with said opening in the lowermost of said base trays; and a vertically disposed drain pipe having a lower open end engaged within said socket in said lowermost base tray and an upper end communicating with the drain bowl opening next thereabove; whereby the lower end of said drain pipe is maintained clear of said opening in said lowermost of said base trays defining an excrement removal and drain means for the free flow draining of waste from said plurality of trays into said main drain.

2. Structure in accordance with claim 1 in which each base tray has two pans with an intermediate rim between them and in which said socket is disposed between one end of said intermediate rim and an adjacent portion of said peripheral rim.

3. Structure as claimed in claim 1 in which the base trays are arranged in a plurality of adjoining stacks, the base trays in any one stack being detachably connected to the said posts which support them and are shiftable in vertical position independently of the base trays in an adjoining stack.

4. Structure as claimed in claim 1 in which there are brackets carried by at least one of said base trays and situated between the lowermost adjoining base trays, and a vertical divider seated on and supported by said brackets.

5. Structure as claimed in claim 1 in which the base trays have a depression therein forming a dish for containing food and water.

6. Structure as claimed in claim 1 including doors hingedly and vertically adjustably connected to said posts, whereby said doors are shiftable vertically along said posts to preselected portions therealong.

7. Structure as claimed in claim 6 including locking means connected to the free edge of said doors and coacting with at least one of said posts at any point along said post.

8. Structure as claimed in claim 1 in which at least one of the cages has a detachable intermediate door pivoted from the under portion of the next superposed base tray.

9. Structure as claimed in claim 8 including means urging said intermediate door to an elevated position thereof affording an unobstructed passage therebeneath to all parts of the upper surface of the particular base tray, forming the floor of a cage.

10. Structure as claimed in claim 1 with at least one of the base trays having a detachable intermediate door pivoted from the under portion of the next superposed base tray; with means urging said intermediate door to an upper position thereof affording an unobstructed passage between the said two pans; in which the free swinging edge of the intermediate door has bolt means; and in which an intermediate rim has a latch portion with which said bolt means coacts to detachably connect the door to the said lock portion to maintain the intermediate door in a vertical closed position, isolating said pans from each other.

11. Structure as claimed in claim 1 in which the said posts have a longitudinally arranged groove and have detachably connected thereto frictionally in said groove an elongated carrier which is U-shaped in cross section, for holding anti-insect material, said carrier having resilient flanges engaging the walls of said groove.